April 19, 1960
A. V. FISH
2,933,262
HOSE ROLLER
Filed Jan. 3, 1957
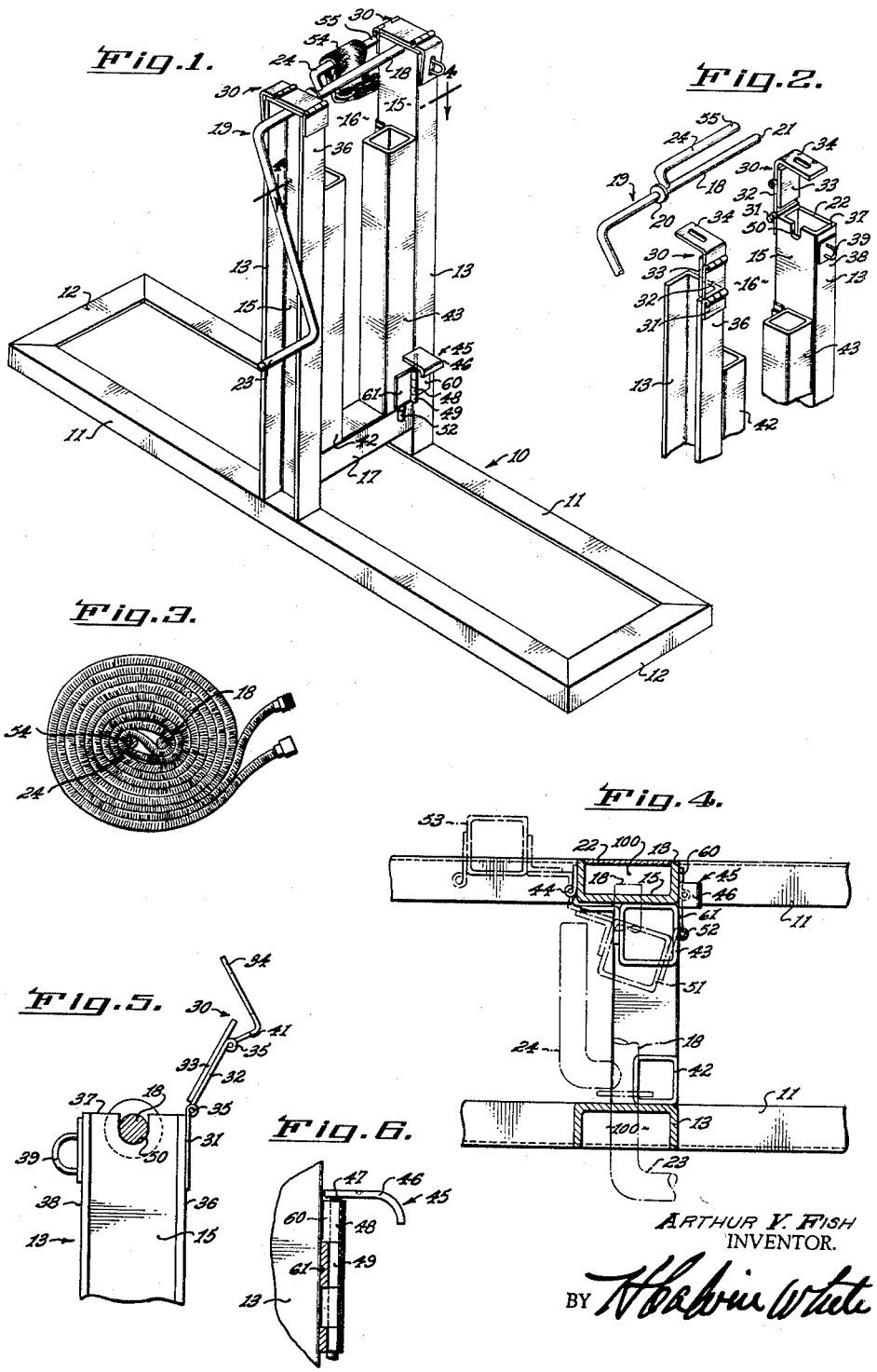
ARTHUR V. FISH
INVENTOR.
BY
ATTORNEY United States Patent Office 2,933,262
Patented Apr. 19, 1960

2,933,262

HOSE ROLLER

Arthur V. Fish, Sun Valley, Calif.

Application January 3, 1957, Serial No. 632,304

6 Claims. (Cl. 242—86.1)

This invention relates generally to winding apparatus, and more particularly has to do with a particular type of equipment used for winding lengths of relatively wide hose such as collapsible fire hose in a spiral wound configuration, as will be described.

In general, it may be stated that fire hose must be wound in a particular way so that the rolled hose will not be excessively creased to an extent damaging the hose, and so that it will not be loosely wound causing it to fall apart when rolled. Another requirement is that in some cases the opposite end couplings on the hose shall be at the outside of the wound roll in order to be rapidly and freely connectible to the couplings on other hose. This latter requirement means that the innermost end of the spiral winding comprises a looped intermediate hose portion, which is likely to become excessively flattened because of the collapsible nature of fire hose and also because of the tendency in hand winding a fire hose to form the spiral too tightly. This latter condition is explained by the circumstance that it is found difficult to hand wind a fire hose sufficiently loosely to prevent possible damage to the looped intermediate hose portion at the inside of the spiral due to repeated winding, since the spiral must be kept sufficiently tight to keep it from falling apart in rolled condition.

It is the general object of the present invention to provide a hose winding device designed to rapidly wind a hose by operation of the device, the device controlling the tightness or winding of the spiral automatically to prevent successive flattening of the looped portion of the hose while at the same time providing for sufficient tightness of the winding to prevent its falling part upon removal from the device. Equally as important, the invention is concerned with a device capable of winding a hose and supporting it during winding in such manner that the wound hose is readily detachable from the device at the end of winding, as will be described.

Another object of the invention is the provision of means for guiding the hose during its winding to result in a uniformly thick spirally wound hose, the guide means accommodating different size hoses without subtracting from the guiding efficiency.

The above objects are uniquely satisfied by a fire hose winding device comprising a base and a pair of laterally spaced supports, a crank movably supported by upper portions of the supports, the crank including a shaft extending transversely within the space between the supports and a handle at the outside of that space for turning the shaft to wind a fire hose about the shaft in a plane extending through that space, together with separate retainers extending over the supported parts of the shaft blocking dislodgement thereof off the supports during turning of the crank. These blocking means or retainers are quickly releasable from shaft blocking relation to permit shaft removal off the supports so that the hose wound about the shaft may be slipped off a removed end of the shaft. The crank preferably includes an arm extending transversely in offset relation to the shaft, the arm having a free end for receiving a portion of the hose looped thereover, so that upon winding it will be wrapped about both the transverse shaft and the arm with the degree of required balance between tightness and looseness for the purposes explained above.

Still another feature of the invention includes the provision of a spacer upstanding in the space between the supports to guide a hose being wound when the hose is of smaller width than the space between the supports. The invention includes means for securing the spacer in different lateral positions with respect to the space between the supports so as to accommodate guided winding of different width fire hoses.

Other features and objects of the invention, as well as the details of an illustrative embodiment, will be more fully understood from the following detailed description of the drawings, in which:

Fig. 1 is a perspective view of the completely assembled fire hose winding device;

Fig. 2 is a fragmentary perspective view of the upper portion of the device with the winding crank removed from its supports;

Fig. 3 is an elevation showing a hose wound on the winding crank in accordance with the invention;

Fig. 4 is an enlarged plan view of a fragmentary portion of the assembly winding device;

Fig. 5 is an elevation showing an enlarged fragmentary upper portion of the device; and Fig. 6 is an enlarged elevation illustrating the manner in which the hose guiding spacer is latched to a support.

In the drawing the base 10 of the device is formed by a rectangular horizontal frame consisting of a spaced pair of elongated side members 11 interconnected by a spaced pair of short end members 12, as by welding. Upstanding from the approximate mid-sections of the members 11 are a pair of vertical laterally spaced supports 13 the upper portions thereof being equally spaced above the base at a distance at least as great as the approximate radius of the spiral wound hose shown in Fig. 3. The supports comprise channels opening laterally away from each other so that the vertical webs 15 of the channels form between them a space 16 through which the hose is wound. A cross member 17 bridging the space 16 between the channel supports interconnects the lower portions thereof.

Sunk downward from the upper edges of the webs 15 of the channel supports are a pair of horizontally aligned recesses 50 opening transversely through the support webs 15. These recesses receive the shaft 18 of a crank device 19 so that the shaft is supported at two places therealong for rotation. The shaft is inserted downwardly into place in the recesses and is kept from endwise removal from the supports by interference between a washer 20 suitably connected to the shaft and the web 15 of one support and also by interference between the end 21 of the shaft and a plate 22 connected with the other support and extending oppositely to and in alignment with recesses 50 outside the space 16.

The winding crank also includes a handle 23 extending outside space 16 for freely guiding or turning the shaft 18. Finally, the winding crank includes an arm 24 connected with the shaft 18 and also extending transversely in offset parallel relation with the shaft at a suitable distance therefrom. For best results, the transverse extent of the arm should be offset from the shaft at a distance of about 1½ inches therebetween, so as to accommodate winding of the hose without undesirable flattening of the looped end thereof or looseness of the wound roll.

The shaft 18 of the crank during hose winding is subject to pivoting at each of the supports 13 according to the direction of force exerted on the handle 23. Thus, when downward force is exerted on handle 23 the shaft fulcrums at the support 13 next to the handle, and it is fulcrumed at the opposite support when an upward force is exerted on the handle 23 during turning. Such pivoting tends to result in upward dislodgement of the shaft from the recesses 50, so that it becomes necessary to prevent inadvertent removal of the shaft off the supports. However, it is also desirable that the shaft 18 be quickly removable from the recesses so that the wound hose may be rapidly slipped off the ends of the shaft 18 and arm 24 for stacking.

To satisfy the above requirements, a pair of retainers 30 are provided for blocking dislodgement of the shaft 18 from the recesses 50 during turning of the crank, the retainers being quickly releasable from shaft blocking relation to permit rapid shaft removal upwardly off the supports. As shown in Figs. 4 and 5, each retainer includes a series of small plates 31 through 34 interconnected by hinges 35 so that the plates 31, 32 and 34 may pivot independently of one another. The end plate 31 of each retainer is suitably connected with the vertical outside 36 of a support 13 so that the adjacent plate 32 may pivot downward toward and upward away from the top 37 of the support in overlying relation to a recess 50, and the channel space 100. Elbow-shaped plate 34 is adapted to swing downward at the side 38 of the support 13 opposite side 36 thereof in latching relation with an apertured tongue 39 which then projects through an opening in the plate 34. Under these conditions, the apertured tongue 39 serves to lock a retainer in position on the support confining the shaft against removal.

An intermediate plate 33 connected with plate 32 is adapted to bear downward against the upper end 37 of the support when the retainers are in shaft blocking position, plate 33 extending all the way across the support upper end between sides 36 and 38 thereof and over channel space 100. In this position, the leg 41 of the elbow plate 34 is supported by the end portion of plate 33 projecting beyond the interconnecting hinge 35, as shown in Fig. 5. When it is desired to quickly remove the shaft 18 from the supports, the retainers are readily and quickly releasable from shaft blocking relation merely by pivoting them about the hinges 35 to a representative position as shown in Fig. 5, at which time the cranking device may be readily lifted off the supports.

For guiding the hose during winding thereof a spacer 42 upstanding in space 16 adjacent a support 13 is suitably connected to the support and to the cross member 17 as shown in Figs. 1 and 4, the spacer being sufficiently elongated to guide the outer windings of the hose in successive overlapping relation with prior windings. In addition, another spacer 43 upstanding in space 16 as seen in Figs. 1 and 4 is pivotally connected with the other support 13 as by suitable piano hinge 44 so that this second spacer may pivot about a vertical axis from a position adjacent the other support, as seen in Fig. 4 to different positions spaced from that support as shown in the broken lines. Thus, for winding 1½" hose, that is hose having a 1½ inch cross dimension, the spacer may be latched in the full line position adjacent the support, as by the latching device 45 comprising a handle 46 carrying a vertical pin 47 received in openings formed by hinge elements 48 and 49 respectively carried by plates 60 and 61 carried by the spacer and the support 13. For winding 1½" hose the spacer may be swung to the position shown at 51 in Fig. 4 and latched in that position by the same handle and pin latch, with the pin being received in a hinge element 52 carried by the cross member 17, and also by the hinge elements 49 carried by the spacer. Finally, the spacer may be swung around to the position shown at 53 in Fig. 4 so that 2½" hose may be guided by spacer 42 and by the web 15 of the opposite support, the spacer 43 at this time not being used for guiding the hose during winding thereof.

In operation, the looped intermediate hose portion 54 may be slipped over the free end 55 of the arm 24 and the cranking device set on the supports 13. Alternately the cranking device may be first placed on the supports and the looped end of the hose fitted on the arm projecting transversely above the shaft portion between the supports. After the retainers are carried across the upper ends of the supports, the cranking device may be turned to wind the hose into the shape shown in Fig. 3. Thereafter, the retainers may be quickly released and the cranking device removed from the supports to free the hose for removal from the shaft 18 and arm 24.

I claim:

1. A heavy fire hose winding device, comprising a heavy metallic frame including a longitudinally elongated horizontal base and a pair of laterally spaced vertical supports upstanding from the base approximately midway between opposite ends thereof, the upper portions of said supports containing recesses opening transversely through the supports and upwardly therefrom, a crank removably supported by said support top portions, said crank including a shaft received in said recesses to a depth equal to at least the shaft diameter and extending tranversely therethrough and across said space, said crank also including a handle outside said space for turning the shaft to wind a fire hose thereabout in a vertical plane extending through said space and an arm connected with said shaft within said space and extending transversely in offset spaced relation thereto, said arm having a free end for receiving a looped portion of the hose thereover, a spacer upstanding in said space near one support and terminating below the connection between said arm and shaft for guiding a hose being wound when said hose is of smaller width than said space, said arm being vertically offset from the spacer throughout arm rotation carrying it between the spacer and shaft, the free ends of said arm and shaft being remote from said handle and the offset spacing between said arm and shaft being within the width range of fire hose to be wound on said arm and shaft, and a pair of vertically movable gravity actuated retainers carried by the supports and extending downwardly along the support sides and also over said upper portions of the supports and over said recesses blocking dislodgement of the shaft off the supports during turning of the crank while accommodating free turning of the shaft, said retainers and supports having vertically spaced shoulders at the sides of the supports releasably holding said downwardly gravity actuated retainers against upward removal away from said recesses, the retainer shoulders being laterally and upwardly movable out from under the support shoulders to permit said retainer to be removed upwardly whereby the retainers are quickly releasable from shaft blocking relation to permit the shaft to be removed upwardly off the supports so that the hose wound about the shaft may be slipped off a removed end thereof and off said arm.

2. The invention as defined in claim 1 in which said retainers include pivotally interconnected elements extending above the upper ends of the supports and downward along the sides thereof.

3. The invention as defined in claim 2 in which some of said elements are rigidly connected with the supports.

4. The invention as defined in claim 3 in which others of said elements have said shoulders which are releasably connected with the support shoulders and said other elements are freely pivotable upward and away from the supports when released from connection therewith.

5. The invention as defined in claim 1 including another spacer upstanding in said space near the other support, and means for connecting the other spacer to said frame with the spacer at different lateral positions with respect to said space so as to accommodate guided winding of different width fire hoses, said arm having a free end vertically offset from said other spacer throughout arm rotation carrying it between said other spacer and said shaft.

6. The invention as defined in claim 5 comprising a pivot connection between the other spacer and frame and a latch for releasably connecting the pivoted spacer with said frame when the spacer is in said different position.

References Cited in the file of this patent

UNITED STATES PATENTS

| Number | Name | Date |
|---|---|---|
| 527,365 | Crabtree | Oct. 9, 1894 |
| 786,049 | Naylor | Mar. 28, 1905 |
| 1,263,798 | Otto | Apr. 23, 1918 |
| 1,318,800 | Radcliff | Oct. 14, 1919 |
| 1,348,242 | Ross | Aug. 3, 1920 |
| 2,045,966 | Ruehmann | June 30, 1936 |
| 2,355,441 | Jacob | Aug. 8, 1944 |